US012627731B2

(12) United States Patent
Earwood et al.

(10) Patent No.: US 12,627,731 B2
(45) Date of Patent: May 12, 2026

(54) SYSTEM AND METHODS FOR TRANSMITTING INFORMATION USING AN ELECTRONIC MEDIA

(71) Applicant: KBR Wyle Services LLC, Houston, TX (US)

(72) Inventors: Lance Earwood, Houston, TX (US); Jennifer Renée Tompkins, Beavercreek, OH (US); Daniel Cummins Wlodarski, Kettering, OH (US); Herb Hirsch, Houston, TX (US)

(73) Assignee: KBR Wyle Services, LLC, Houston, TX (US)

( * ) Notice: Subject to any disclaimer, the term of this patent is extended or adjusted under 35 U.S.C. 154(b) by 0 days.

(21) Appl. No.: 18/355,294

(22) Filed: Jul. 19, 2023

(65) Prior Publication Data

US 2024/0031431 A1 Jan. 25, 2024

Related U.S. Application Data

(60) Provisional application No. 63/391,231, filed on Jul. 21, 2022.

(51) Int. Cl.
*H04L 67/1074* (2022.01)
*H04L 67/561* (2022.01)
*H04L 67/60* (2022.01)

(52) U.S. Cl.
CPC ........ *H04L 67/1074* (2013.01); *H04L 67/561* (2022.05); *H04L 67/60* (2022.05)

(58) Field of Classification Search
CPC ... H04L 67/561; H04L 67/562; H04L 67/564; H04L 67/565
See application file for complete search history.

(56) References Cited

U.S. PATENT DOCUMENTS

| | | | |
|---|---|---|---|
| 6,747,762 B1 * | 6/2004 | Josephsen | ................. G06T 9/00 |
| | | | 358/453 |
| 6,912,317 B1 * | 6/2005 | Barnes | ................... H04N 19/13 |
| | | | 375/E7.199 |
| 9,667,982 B2 | 5/2017 | Benight | |
| 10,970,811 B1 * | 4/2021 | Aksoy | ..................... G06F 3/013 |
| 2003/0123740 A1 * | 7/2003 | Mukherjee | ........... H04N 19/649 |
| | | | 382/239 |
| 2009/0100495 A1 * | 4/2009 | Manapragada | .. H04N 21/43615 |
| | | | 725/138 |

(Continued)

OTHER PUBLICATIONS

International Searching Authority; Patent Cooperation Treaty, International Search Report and Written Opinion dated Oct. 19, 2023 for International Application No. PCT/US2023/070530 filed Jul. 19, 2023 (9 pages).

*Primary Examiner* — Hieu T Hoang
(74) *Attorney, Agent, or Firm* — Gary M. Machetta

(57) ABSTRACT

A method for transmitting a source file includes receiving at least one input relating to the transmission of the data; selecting a transmission strategy using the at least one input; processing the data using the selected transmission strategy; transmitting the processed data; transmitting metadata defining the selected transmission strategy; and processing the transmitted data using the transmitted metadata. A related system may include a transmission system and receiving station configured to perform such a method.

18 Claims, 3 Drawing Sheets

(56)          References Cited

U.S. PATENT DOCUMENTS

| | | | | |
|---|---|---|---|---|
| 2009/0153737 | A1* | 6/2009 | Glen | H04N 5/21 348/E5.062 |
| 2009/0290645 | A1* | 11/2009 | Mabey | H04N 19/179 375/E7.027 |
| 2010/0104021 | A1* | 4/2010 | Schmit | H04N 19/139 375/E7.026 |
| 2012/0069911 | A1* | 3/2012 | Richardson | H04L 65/1059 375/E7.199 |
| 2012/0275511 | A1* | 11/2012 | Shemer | H04N 19/14 375/E7.126 |
| 2014/0115128 | A1* | 4/2014 | Myrberg | G06F 9/5061 709/221 |
| 2015/0043655 | A1* | 2/2015 | Nilsson | H04N 19/17 375/240.26 |
| 2015/0117839 | A1* | 4/2015 | Oberbrunner | H04N 21/237 386/280 |
| 2016/0196687 | A1* | 7/2016 | Alpert | G06T 15/00 345/419 |
| 2017/0111661 | A1 | 4/2017 | Boyce | |
| 2019/0014388 | A1* | 1/2019 | Rutledge | H04N 21/6379 |
| 2020/0119747 | A1* | 4/2020 | Kallam | H03M 7/702 |
| 2020/0177941 | A1* | 6/2020 | El Essaili | H04L 65/70 |
| 2021/0256735 | A1 | 8/2021 | Tourapis et al. | |
| 2022/0069839 | A1 | 3/2022 | Parker | |
| 2022/0222864 | A1* | 7/2022 | Lee | G06T 9/002 |

* cited by examiner

SYSTEM AND METHODS FOR TRANSMITTING INFORMATION USING AN ELECTRONIC MEDIA

CROSS REFERENCE TO RELATED APPLICATIONS

This application claims the benefit of U.S. Provisional Application No. 63/391,231, filed on Jul. 21, 2022, which is incorporated herein by reference in its entirety.

BACKGROUND

1. Technical Field

Embodiments described herein generally relate to systems and methods for processing information to be transmitted over an electronic media or network.

2. Description of the Related Art

Transmitting information between two or more locations using an electronic media is now commonplace. However, factors such as cost, transmission quality, latency, and bandwidth restrictions may create obstacles to transmission of information. By way of example, files containing visual images may easily approach gigabytes in size. Transmitting such large file sizes may incur burdensome costs on certain networks and/or suffer quality or latency issues on other networks.

SUMMARY

In examples, provided are systems and methods for transmitting information using an electronic media. In examples, the systems and methods discussed herein may be used for transmitting a source file. Examples disclosed here may be able to address the drawbacks of the prior art and/or other drawbacks.

In examples, provided is a method for transmitting data, including receiving at least one input relating to a transmission of the data; selecting a transmission strategy using the at least one input; pre-transmission processing the data using the selected transmission strategy; generating metadata reflecting one or more pre-processing and/or compression executing during pre-transmission processing; transmitting the data after the pre-transmission processing; transmitting the metadata generated; and post-transmission processing the data transmitted using the metadata generated.

In examples, selecting the transmission strategy may include selecting at least one of: (i) a pre-processing, and (ii) a compression.

In examples, the at least one input may include at least one of: (i) a source file descriptor, (ii) a user-defined-input, (iii) a system environment dynamic, and (iv) historical information.

In examples, the pre-transmission processing of the data may include pre-processing and compressing the data.

In examples, post-transmission processing the data transmitted may include decompressing and post-processing the data transmitted.

In examples, selecting the transmission strategy may include selecting a pre-processing method and a compression method.

In examples, provided is a method for transmitting a source file representing visual images, including generating the source file using an imaging device; receiving at least one input relating to a transmission of the source file at a transmission system; using the transmission system to select a transmission strategy, wherein the transmission strategy may be selected using at least one user-defined input, wherein the transmission strategy may include at least one pre-processing method and at least one compression method; pre-transmission processing the source file using the selected transmission strategy, wherein the pre-transmission processing may include pre-processing the source file using the at least one pre-processing method and compressing the source file using the at least one compression method; generating metadata reflecting the pre-processing method and the compression method; transmitting the source file after pre-transmission processing to a receiving station; transmitting the metadata generated; and decompressing and post-processing the source file transmitted to the receiving station using the generated metadata using the metadata generated.

In examples, the at least one input may include at least one of: (i) a source file descriptor, (ii) a user-defined-input, (iii) an environment dynamic, and (iv) historical information.

In examples, the transmission system may select the transmission strategy by at least one of: (i) iterating through combinations of pre-processing methods and compression methods, and (ii) using a lookup table.

In examples, provide is a system for transmitting data, including a transmission system that may include a general-purpose computer configured to: receive at least one user-defined input relating to the transmission of the data; select a transmission strategy using the at least one user-defined input; pre-transmission process the data using the selected transmission strategy; generate metadata reflective of the selected transmission strategy; transmit the processed data; and transmit the generated metadata.

In examples, the system may include an imaging device configured to generate a source file containing the data.

In examples, the at least one input may include at least one of: (i) a source file descriptor, (ii) a user-defined-input, (iii) an environment dynamic, and (iv) historical information.

In examples, the transmission system may be configured to select the transmission strategy by at least one of: (i) iterating through combinations of pre-processing methods and compression methods, and (ii) using a lookup table.

In examples, the system may include a receiving station configured to process the transmitted processed data using the generated metadata.

In examples, the receiving station may be configured to decompress and post-process the transmitted data.

In examples, the transmission system may be configured to select the transmission strategy by selecting a pre-processing method and a compression method.

Examples of certain features of the disclosure have been summarized broadly in order that the detailed description thereof that follows may be better understood, and in order that the contributions to the art may be appreciated. There are, of course, additional features of the disclosure that will be described hereinafter and which will in some cases form the subject of the claims appended thereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION

Figure 1:
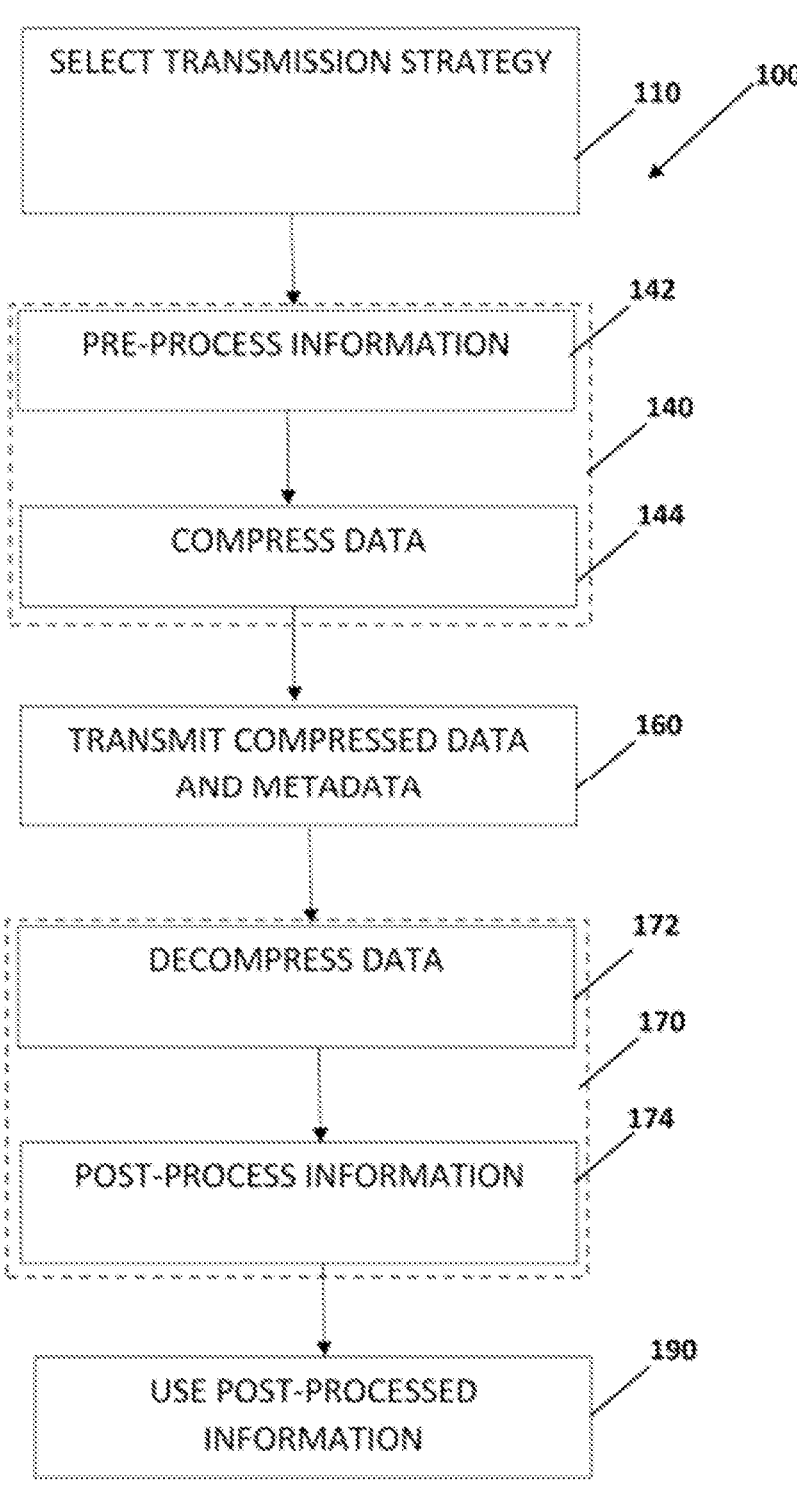
FIG. 1 is a flowchart that illustrates one non-limiting method for conveying information according to the present disclosure.

In examples, the present disclosure provides methods and related systems for transmitting information using electronic media. In examples, methods and related systems may be used to compress information for transmission over an electronic media. In examples, the methods and related systems based on input information may select a transmission strategy by selecting one or more pre-processing parameters. In examples, the methods and systems may be configured to obtain information about the file to be transmitted and derive one or more pre-processing parameters based on the obtained information. In examples, the set of selected pre-processing parameters may define a transmission strategy. In examples, based on the selected transmission strategy, methods and systems may pre-transmission process of the information. In examples, the pre-transmission processing of information may include pre-processing and/or compression of the information. In examples, the methods and systems may include a determination relating to the compression of the information. In examples, the pre-processing and/or compression methods to carry out may be based on the pre-processing parameters of the selected transmission strategy based on information received by the system. In examples, the information received by the system may include a source file or other electronic information that is to be transmitted. In examples, the information received by the system may also include additional information that may impact how the information to be transmitted is to be processed pre-transmission. In examples, the methods and systems may include a transferring of the pre-processed and/or compressed information. In examples, information transfer may include transfer of metadata in addition to the pre-processed and/or compressed information, the metadata reflecting the pre-transmission processing applied to the transmitted information. In examples, the methods and systems may include a post-transmission processing of the transmitted information. In examples, the post-transmission processing may include post-processing and/or decompression of the transmitted information. In examples, the post-transmission processing includes at least decompressing the transmitted information. In examples, the post-transmission process may be based on the metadata received via the transfer.

As used herein, the term 'electronic media' includes any network or data transmission architecture wherein data is communicated between two or more locations. The electronic media may be wired; e.g., conductive cables, optical fibers, etc. The electronic media may also be wireless; e.g., internet, radio signals, etc. Merely for ease of explanation, the discussion below may refer to a source file having data representing visual images and a transmission media. A non-limiting example of a source file is data representing a single visual image, or a plurality of visual images, i.e., frames for a video.

In examples, the information to be transmitted may include a source file. In examples, the pre-processing and/or post-transmission processing may be based on information pertaining to the source file. For ease of reference, in the following description the information to be transmitted will be referred to as a source file. As used herein, the term "source file" refers to any electronic information, it may come in any format, and be utilized for any purpose. In examples, as described below, the source file may include images, videos, or other documents. In examples, a source file may include medical information. However, these are just examples as the source file may contain any type of information. In examples, the methods and systems as described may be well suited for source files of large size. However, the methods and systems described are not limited to the transmission of source files within a size range.

Reference will now be made in detail to an embodiment of the present invention, example of which is illustrated in the accompanying drawings.

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. Where there is a plurality of definitions for terms herein, those in this section prevail. Where reference is made to a URL or other such identifier or address, it is understood that such identifiers can change and information on the internet can come and go, but equivalent information can be found by searching the internet. Reference thereto evidences the availability and public dissemination of such information.

As used herein, the singular forms "a", "an", and "the" include plural referents unless the context clearly dictates otherwise.

The terms first, second, third, etc. as used herein can describe various elements, components, regions, layers and/or sections, these elements, components, regions, layers and/or sections should not be limited by these terms. These terms may be only used to distinguish one element, component, region, layer, or section from another region, layer, or section. Terms such as "first", "second", and other numerical terms when used herein do not imply a sequence or order unless clearly indicated by the context. Thus, a first element, component, region, layer, or section discussed below could be termed a second element, component, region, layer, or section without departing from the teachings of the example embodiments.

As used herein, ranges and quantities can be expressed as "about" a particular value or range. "About" also includes the exact amount. Hence "about 5 percent" means about 5 percent in addition to 5 percent. The term "about" means within typical experimental error for the application or purpose intended.

As used herein, "and/or" includes any and all combinations of one or more of the associated listed items.

As used herein, a "combination" refers to any association between two items or among more than two items. The association can be spatial or refer to the use of the two or more items for a common purpose.

As used herein, "comprising" and "comprises" are to be interpreted to mean "including but not limited to" and "includes but not limited to", respectively.

As used herein, "optional" or "optionally" means that the subsequently described event or circumstance does or does not occur, and that the description includes instances where the event or circumstance occurs and instances where it does not. For example, an optional component in a system means that the component may be present or may not be present in the system.

As used herein, the term "payload" refers to the pre-transmission processed information or source file that is being transmitted. In examples, payload is used to distinguish between the information intended for transmission, e.g. the pre-transmission processed information or source file, and the metadata generated by the system and method described herein that is also transmitted with the payload to inform the receiving system of the pre-transmission processing.

As used herein, "substantially" means "being largely but not wholly that which is specified."

Referring to FIG. 1, there is illustrated a flow chart for one non-limiting method and system according to the present disclosure. The method 100 may include selecting a transmission strategy 110, pre-transmission processing the information to be transmitted at 140, transmitting the processed information at 160, and post-transmission processing the transmitted information at 170. In examples, the information to be transmitted may be computer data. In examples, the computer data may be a file, herein referred to as source file. In examples, pre-transmission processing the source file at 140 may include pre-processing the source file at 142 and/or compressing the source file at 144. Likewise, the post-transmission processing at 170 may include decompressing the source file at 172 and/or post-processing the source file at 174. In examples, the pre-transmission processing at 140 and the post-transmission processing at 170 may 'mirror' one another.

Figure 2:
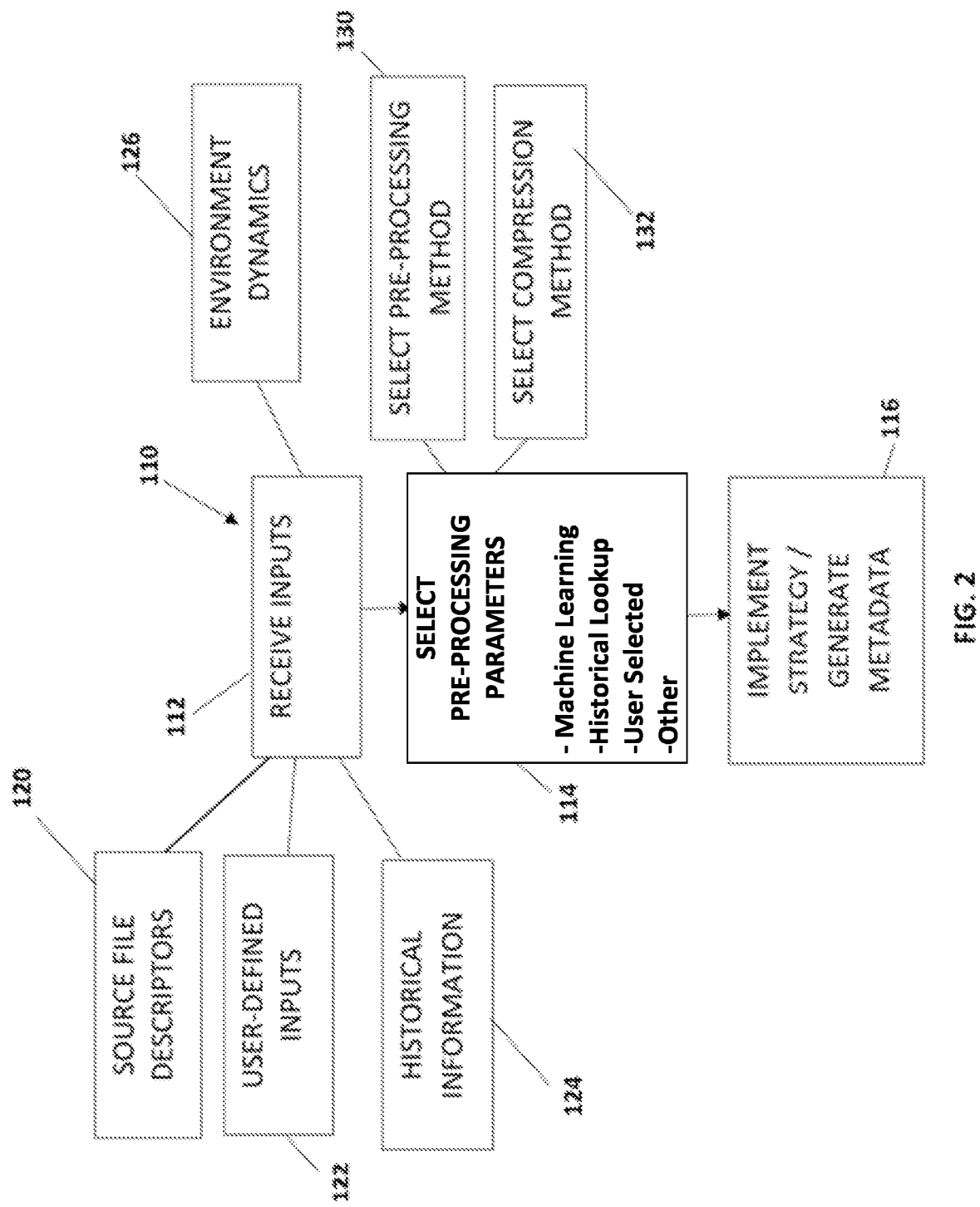
FIG. 2 is a flowchart that illustrates one non-limiting method for selecting a strategy for transmitting information.

FIG. 2 an example flow diagram involving the determination or selection of a transmission strategy at 110. In examples, the process at 110 may include one or more of receiving inputs at 112, applying a selection logic at 114, and implementing the selection logic at 116.

In examples, when a source file is received at 112, information affecting the efficiency of the signal transmission may be assembled. By efficiency, it is meant factors or considerations that may affect the quality, quantity, and fidelity of the information to be transmitted. Illustrative, but not exhaustive, types of information include one or more of source file descriptor 120, user-defined-inputs 122, historical information 124, and system environment dynamics 126. Other information may also be considered in place of and/or in addition to 120 to 126.

In examples, source file descriptors 120 may include information relating to the nature of the source file. In examples, source file descriptors 120 may include information relating to and/or embedded in the source file. In examples, source file descriptors 120 may be read from source file metadata and/or derived from source file binary. In examples, the source file descriptors 120 may include one or more of modality, frame rate, image/frame count, pixel resolution, color depth, informational entropy, or other like information. For example, a source file descriptor 120 may include one or more of MRI files, ultrasound images, radiograph images, audio files, multimedia files, raw RADAR data files, etc. This information may be helpful as each file type may present information using different colors, contrasts, resolution, intensity, or other characteristics. In examples, source file descriptors 120 may include information relating to source file size or other transmission-affecting aspect of the source file.

In examples, user-defined-inputs 122 may include one or more user specified rules, requirements, or criteria for the transmission of the source file. In examples, one or more user-defined-inputs 122 may be prompted from a user via third-party interface. In examples, the one or more user-defined-inputs 122 may then be passed into the algorithm of the system and method implementation via API. Non-limiting examples of user-defined inputs 122 may include one or more of a desired image fidelity, transmission purpose or end-use for the transmitted information, recipient specialty, end use or other criteria the source file should meet after transmission and processing. In examples, image or video fidelity may be defined using a common standard such as Video Multimethod Assessment Fusion (VMAF) from NET-FLIX. Thus, in some situations, 'video fidelity' may refer to a minimum threshold for similarity between a source file prior to transmission and the source file after transmission. An example of transmission purpose that may be a user-provided input 122 for a source file may include use in the medical field, visual contact, visual confirmation, generic, or others. For example, the user-provided input 122 may specify criteria of whether the intended use of the transmitted source file is medically 'consultative' or 'diagnostic.' In examples, 'consultative' may refer to information used to understand the general nature of a medical condition whereas 'diagnostic' may refer to information used to diagnose and formulate a treatment for the medical condition.

In examples, historical information 124 may include information that associates pre-processing method and/or compression method for certain inputs. In examples, historical information 124 may be empirically determined and/or may include one or more previously selected pre-processing parameters. In examples, historical information 124 may include and/or be arranged in one or more lookup tables. For example, certain end uses may require better image fidelity than certain pre-processing methods and/or compression methods provide. In examples, this correlation may be mapped in one or more lookup tables based on previous data pre-transmission processing and/or transfers. In examples, lookup tables may be static; i.e., include constant, pre-programmed information. In examples, lookup tables may be dynamic in that the information in such lookup tables may be periodically and/or dynamically updated based on performance, efficiency, and/or other factors as source files are compressed, transferred, and/or decompressed.

In examples, input of system environment dynamics 126 may include transmission method and/or network information. In examples, the system environment dynamics 126 may reflect or include information regarding the system being used including without limitation the operating system, hardware platform, available computing resources, transmission bandwidth, latency, etc. In examples, the method and/or system described herein may poll system environment dynamics 126 from third-party APIs at run-time. In examples, input of system environment dynamics 126 may include a transmission method such as cellular wireless, Bluetooth, ethernet wired, encrypted UHF, or others. In examples, input of system environment dynamics 126 may include preset or real-time information about one or more of the bandwidth, cost, noise, or other factors that may impair the quality, speed, and/or volume of data to be transmitted.

In examples, based on one or more of the inputs 120-126, the method and system described herein may utilize one or more algorithms to select a transmission strategy 110 by selecting one or more pre-processing methods 130 and/or compression methods 132 for the source file that can be carried out during the pre-transmission process at 140.

The algorithm may use a variety of techniques to select appropriate pre-processing method and/or compression method for a given source file. One technique may iterate through every combination of pre-processing and/or compression methods 130 and 132 and select either or a combination thereof that best meets one or more criteria such as image fidelity, bandwidth usage, cost, etc. Another technique may eliminate certain pre-processing, compressions, and/or combinations thereof based on one or more of the inputs 120-126. For example, certain pre-processing methods 130, compression methods 132, or pre-processing and compression method combinations, may not provide satisfactory results for diagnostic uses. In examples, one or more user selections may be received, for example as user-defined-inputs 122 or otherwise that can affect the selection of one or more pre-processing methods and/or compression methods and/or combinations of same. Those pre-processing/compression methods 130/132 or combinations of same may be eliminated as candidates for the strategy. Conversely, a technique may prefer certain pre-processing/compression methods 130/132 or combinations of same, based on one or more given inputs 120-126.

In examples, based on one or more inputs 120-126 relative to an input source file, the method and system may be able to select a transmission strategy 110 by selecting one or more pre-processing parameters. In examples, pre-processing parameters identify and optionally configure the pre-transmission processing 140 in accordance with the transmission strategy 110 to be conducted on the source file to be transmitted. Illustrative, but not exhaustive, pre-transmission processing 140 of a source file may include one or more of transmission format, conventional compression algorithms, sub-/super-sampling degree, image partitioning method, etc. In examples, the system or method may include an algorithm informed of available pre-processing parameters from modular extensions of the available pre-processing and/or compression modules. In examples, the available pre-processing and/or compression modules may be stored in memory. The memory may be on the system device that is processing the information and/or at a remote location such as cloud storage. In examples, a system may include one or more default modules. In examples, the available modules may be updated either manually and/or automatically.

In examples, based on one or more inputs 120-126 relative to an input source file the method and system may be able to select one or more pre-processing parameters based on which one or more data pre-processing and/or data compression methods 130/132 for the given source file to be transferred can be carried out in accordance to at least part of the transmission strategy 110. In examples, the method and system may select a transmission strategy by selecting one or more pre-processing parameters to minimize or eliminate data loss in the transmission of the source file.

In examples, based on one or more pre-processing parameters different portions of a source file may be pre-transmission processed independently and/or differently from one another. For example, a portion of an image file may be processed pre-transmission to retain high level of detail while another portion of the same image may be processed in a way that may not retain as much detail. In examples, the application of pre-transmission processing methods to different portions of the same source file, such as to an image, may be based on one or more inputs 120-126 alone or in combination with other elements such as additional inputs, system and/or network availability, desired degree of lossless resulting from transmission. For example, the selective pre-transmission processing of different areas of an image file may be based on the metadata of the source file, which may include the modality and/or subject of the image. In examples, application of one or more pre-transmission processing to sub-portions of a source file, such as to an image, can be implemented via one or more techniques described herein and/or based on the modular extensions of the pre-transmission processing modules available to the system.

The selection 114 of a transmission strategy by the selection of one or more pre-processing parameters may be contextual selection and/or intelligent selection based on the inputs 120-126. In examples, other information may also be used in addition to and/or in place of inputs 120-126 to carry out the selection of one or more pre-processing parameters. In examples, pre-processing parameters may correlate to one or more data pre-processing methods 130 and/or data compression methods 132.

Illustrative, but not exhaustive, pre-processing techniques include Bit-Plane Reordering; Data-Embedding; Discrete Cosine Transform (DCT); Difference Compactor (DIF-COM); Haar Transform and DIFCOM Combination; Intra-Frame Prediction; Mosaic (create larger image from many smaller images to increase compressibility); Noise Reduction; Region of Detectability (ROD) selection; and Reversible Integer Transform.

An illustrative, but not exhaustive, list of compression methods may include visual encoding techniques including MPEG-1, MPEG-2, H.264 (AVC; MPEG-4 Part 10), H.265 (HEVC; MPEG-H Part 2), AOMEDIA's open-source AV1 video compression, GOOGLE's open-source VP9, APPLE's QuickTime, MICROSOFT's AVI., etc. Illustrative, but not exhaustive, mathematically reversable compression techniques include, but are not limited to 7Z, ZIP, BZIP2, GZIP, etc.

For example, the system and/or method may select pre-processing parameters for a given source file resolution subsampling that may be carried out without compromising image loss. In examples, the system and/or method may select pre-processing parameters for resolution super-sampling to ensure that image details are retained.

In examples, the system and/or method may select pre-processing parameters to maintain image fidelity and a lossless or substantially lossless transmission, and/or select pre-processing parameters for partitioning of informational entropy gradients. Illustrative, but not exhaustive, list of entropy partitioning techniques includes known regions of interest, hot-spot clustering, Region-Based Convolutional Neural Network (R-CNN), You Only Look Once (YOLO), or other like methods.

In examples, the system and/or method may select pre-processing parameters for video encoding. In examples, the pre-processing parameters may correlate to one or more video encoding systems and methods. In examples, video encoding may include the utilization of third-party libraries like platform built-ins (Windows, MacOS, iOS/iPadOS, Android, etc.), FFMPEG group's "libAV," ALLIANCE FOR OPEN MEDIA group's official "aom," NVIDIA's official heterogeneous computing libraries, etc.

In examples, the system and/or method may select pre-processing parameters for raw binary compression.

In examples, the system and/or method may select pre-processing parameters for channel multiplexing.

In examples, the system and/or method may select pre-processing parameters to provide and/or require a degree of reliability assurance and/or error correction. In examples, the pre-processing parameters may reflect the available platform resources and/or performance information best suited for the transmission of the source file.

In examples, the method and system may include the selection of any combination of one or more of these pre-processing parameters. In examples, other pre-processing parameters may also be selected together with or in place of the above.

In examples, different methods may be implemented to make the appropriate selections of pre-processing parameters. In examples, the environment in which the transmission is to be executed may govern the selection.

In examples, the selection of the pre-processing parameters may include an evaluation of the information loss that may result from a given data pre-processing and/or data compression method and/or a combination of pre-processing and/or data compression methods. In examples, one or more pre-processing parameters may be selected based on the least amount of information loss. In examples, a lossless evaluation may be based on the differences and/or fidelity expected for a transmitted file as compared to the original source file.

In examples, the selection of one or more pre-processing parameters may be based on the efficiency and/or speed of transmission. In examples, one or more pre-processing parameters may be selected to achieve the most efficient and/or fastest transmission. In examples, the selection of one or more pre-processing parameters may be based on a combination of lossless evaluation and transmission speed and/or efficiency.

In examples, a lossless evaluation and/or transmission analysis may be integrated in the selection of the pre-processing parameters. In examples, the method and system may carry out the evaluation based on input of the system environment dynamics 126. For example, the method and system may undertake a given lossless analysis and/or transmission analysis based on whether the system environment is detected to include limited capabilities, high-performance computing, or a system therebetween. In examples, the evaluation may be based on sampling, iterative execution, historical data, or any combination thereof.

In examples, for a general-purpose personal computer, the selection can be implemented as a Monte Carlo simulation of pre-transmission processing configurations based on data partition subsamples. For example, in the case of frame-based media, the data partition subsamples may include uniformly spaced windows of frames. In examples, the simulation may be configured to aim to maximize image fidelity and/or minimize size. In examples, the selection of pre-processing parameters therefore may be directed to effectively minimize bandwidth requirements.

In examples, for high-performance computing (HPC), cloud, and/or hybrid platform, the selection of pre-processing parameters can be implemented as a highly parallelized machine learning algorithm. In examples, a machine learning algorithm may be configured to search the configuration space for optimality based on the entire source media rather than subsamples.

In examples, the pre-processing parameters selected can then be stored in memory, informing future configuration space searches.

In examples, for a real-time and/or limited resource platform, for example, embedded systems or mobile devices, the selection may be based on a distributed, on-demand lookup table mapping originating media parameters and metadata to pre-processing parameters. In examples, the mapping may be small and quick to transmit. In examples, the mapping may include a pre-existing default for scenarios where updating it would be impractical.

In examples, once the pre-processing parameters that define a transmission strategy 110 have been selected, the method and system can carry out pre-transmission processing 140 in accordance with the selected transmission strategy 110 by applying the pre-processing parameters correlated data pre-processing and/or data compression methods to process the source file to be transmitted. In examples, the source file is transmitted after and/or during pre-processing and/or compression methods.

In examples, the system and method as described generates metadata reflecting the pre-processing and/or compression methods employed during the pre-transmission processing. In examples, the metadata reflects one or more selected pre-processing parameters. In examples, the generated metadata can include one or more scalar values. In examples, scalar values include configurations and/or parameters that describe and/or identify the pre-processing steps taken. In examples, the metadata may be stored in memory. In examples, the memory may be temporary and/or a log memory. In examples, the metadata may be saved by updating historical information 124.

In examples, the transmission at 160 includes the pre-transmission processed source file (a.k.a. payload) along with the system generated metadata indicative of the selected pre-processing parameters and/or of any data pre-processing and/or data compression executed on the source file. In examples, including the information sent as metadata can be configured to instruct the receiving system how to reverse the pre-processing and/or compression of the source file. Different implementations and manners may be employed to transmit the metadata with the payload. Non-limiting examples of metadata transmission may include a piggyback channel, as headers to the payload, as footers to the payload, interleaved with the payload, and other like methods.

In examples, the receiving system of the transmitted file with metadata can then return the transmitted source file substantially to its original state before pre-processing and/or compression by reversing the data pre-processing and/or data compression based on the metadata communicated with the payload during post-processing 170.

By way of non-limiting examples, if the inputs 120-126 indicate the source file will be used to identify a bone fracture, then the algorithm can select a transmission strategy 110 by selecting pre-processing parameters that can carry out a pre-transmission processing 140 that may highly compress portions of the image representing flesh while preserving the portions of the image representing bone. The selection of pre-processing parameters may be dependent upon the input of system environment dynamics 126.

In another example, if a flesh wound is identified, then the system's algorithm can select a transmission strategy 110 and/or pre-processing parameters that according to which a pre-transmission process 140 can highly compress portions of the image representing bone while preserving the portions of the image representing flesh. The selection of pre-processing parameters may be dependent upon the input of system environment dynamics 126.

In another example, the system's algorithm can base the selection of pre-processing parameters that ultimately dictate pre-transmission processing 140 based on whether user-defined input 122 indicates either 'consultative' or 'diagnostic' as an indicated use. Specifically, if merely a 'consultative' use is indicated, the algorithm may select one or more pre-processing parameters that correspond to a pre-transmission processing phase that exhibits some or greater loss of visual fidelity. Alternatively, if a 'consultative' use is indicated, the algorithm may select one or more pre-processing parameters that correspond to a pre-transmission processing phase that exhibits greater preservation of visual fidelity. Along with the indicated 'consultative' or 'diagnostic' use, the selection of pre-processing parameters may also be dependent upon the input of system environment dynamics 126.

In examples, once the pre-processing parameters have been selected the system may be configured to hand-off the transmission strategy to a transmission system to process the source file according to the correlated pre-processing and/or compression methods and transfer the information.

In examples, a destination system may receive the transferred data pre-processed and/or compressed based on the selected pre-processing parameters. In examples, the destination system may also receive system generated metadata accompanying the transferred payload. In examples, the received metadata may provide information including the selected pre-processing parameters and/or the pre-processing and/or compression methods. In examples, the destination system may be configured to post-transmission process the information to restore it to the original source file. In examples, the destination system may accomplish restoration of the transferred file based on the metadata received by reversing the pre-processing and/or compression methods conveyed by the metadata received. In examples, the restored source file may exhibit little to no loss of information. The restored source file will exhibit no substantive loss of visual fidelity.

Figure 3:
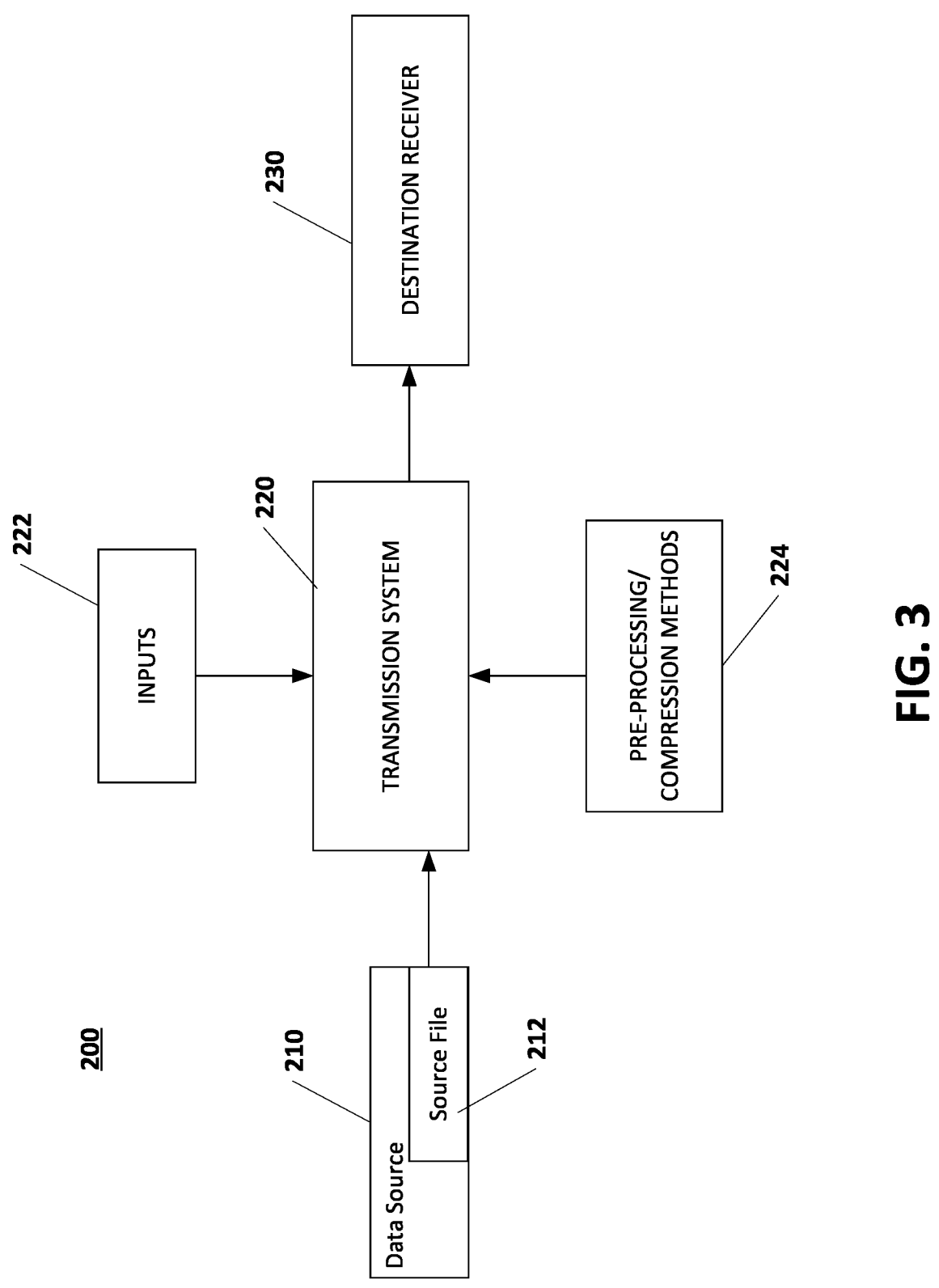
FIG. 3 illustrates a system for selecting a strategy for transmitting information according to embodiments of the present disclosure.

It should be noted that the teachings of the present disclosure are not limited to only files used in connection with rendering medical assistance. Referring to FIG. 3, there is a generalized system 200 according to embodiments of the present disclosure. In examples, system 200 may be configured to carry out the one or more processes and/or functions described herein.

In examples, system 200 may include a data source 210 for providing one or more source files 212. In examples, source file 212 may be generated 'real time' by an imaging device such as an X-ray machine, an ultrasonic device, a camera from a mobile phone, a drone, a webcam, or a security system in a commercial building. A non-limiting example of an imaging device is a medical device configured to image a selected portion of a body. In examples, the data source 210 may include a source file generator. In examples, data source 210 may include a source file database that may contain one or more source files. In examples, the data source 210 may be a memory. In examples, data source 210 may be a user device, remote storage device, cloud memory, or any combination thereof. In examples, a source file 212 may be retrieved from a database; e.g., an archival storage or a database storing multimedia files such as music or movies. In examples, a source file 212 may be generated by a device co-located at the transmission system 220 or at a remote location.

In examples, system 200 may include a transmission system 220. In examples, a transmission system 220 may be a general-purpose computer that includes processing devices, memory modules, signal transmission devices, algorithms, and other equipment conventionally used to receive, process, and transmit one or more source files. The term 'general-purpose computer' intends to be a workstation, laptop, 'tablet,' 'iPad', or other mobile device loaded with suitable apps or software. The system and method may include an algorithm that may be configured to utilize one or more inputs 222 (such as inputs 120-126) to select a transmission strategy by selecting one or more pre-processing parameters that can lead to a source file or data pre-processing, visual encoding and/or compression methods 224. The one or more inputs 222 and pre-processing and/or compression methods 224 may be any of those described previously. In examples, the transmission system 220 may be an application or software that can be executed on a user device and or smart device. In examples, the system 220 may include a computing device as described at a remote location accessible via a network and configured to receive and transmit information and/or configured to execute one or more of the functionalities and/or processes described herein.

In examples, the system may optionally include a destination receiver 230. In example, destination receiver 230 may include a receiving station that may also include a general-purpose computer, a display device for visually presenting the transmitted source file, and related components. In examples, the receiving station may be configured to carry out post-transmission processing of the transmitted payload. In examples, the post-transmission processing may include decompression. In examples, the post transmission processing may include post-processing. In examples, the transmitted payload may be decompressed first and then post-processed. In examples, the decompression and/or the post-processing executed during post-transmission processing may be carried out using the metadata the system generated and transmitted with the payload. The receiving station may be at a location at which the source file is used immediately or stored for later use. Thus, destination receiver 230 may include a display device used by a human operator or a database at which the source file is stored. In examples, a destination receiver 230 may be an application or software that may be executed on a user device such as a computer or smart device.

In examples, the system described herein may include one or more control systems, and other standard components that allows for the control and operation thereof.

In examples, although not shown, system as described herein may be configured to carry out one or more of the described functions and/or processes or methods. In examples, the system as described may include one or more controllers and/or other suitable computing devices may be employed to control one or more of portions of the system described herein. Controllers may include one or more processors and memory communicatively coupled with each other. In the illustrated example, a memory may be used to store logic instructions to operate and/or control and/or monitor the operation of the systems described. In examples, the controllers may include or be coupled to input/output devices such as monitors, keyboards, speakers, microphones, computer mouse and the like. In examples, the one or more controllers may also include one or more communication components such as transceivers or like structure to enable wired and/or wireless communication. In examples, this may allow for remote operation of one or more systems described herein.

In examples, memory associated with the one or more controllers and/or other suitable computing devices may be non-transitory computer-readable media. The memory may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The controls systems may include any number of logical, programmatic, and physical components.

Logic instructions may include one or more software modules and/or other sufficient information for the operation of the systems described. Any operation of the described systems may be implemented in hardware, software, or a combination thereof. In the context of software, operations represent computer-executable instructions stored on one or more computer-readable storage media that, when executed by one or more processors, perform the recited operations. Generally, computer-executable instructions include routines, programs, objects, components, data structures, and the like that perform one or more functions or implement abstract data types.

While the foregoing is directed to embodiments of the present disclosure, other and further embodiments of the disclosure may be devised without departing from the basic scope thereof, and the scope thereof is determined by the claims that follow.

What is claimed is:

1. A method for transmitting data, comprising:
receiving at least one input relating to a transmission of the data;
eliminating one or more of (a) a subset of a plurality of pre-processing techniques or (b) a subset of a plurality of compression methods based on a type of the data and the at least one input;
selecting a transmission strategy based on (a) a Monte Carlo simulation of each remaining pre-processing techniques of the plurality of pre-processing techniques and each remaining compression methods of the plurality of compression methods configured to maximize image fidelity, minimize data size, or some combination thereof, (b) preferences indicated by the at least one input, and (c) the data;
pre-transmission processing the data using the selected transmission strategy;
generating metadata reflecting one or more of pre-processing or compression executed during the pre-transmission processing;
transmitting the data after the pre-transmission processing;
transmitting the metadata generated; and
post-transmission processing the data transmitted using the metadata generated,
wherein selecting the transmission strategy comprises selecting at least one of: (i) a pre-processing from the plurality of pre-processing techniques, and (ii) a compression from the plurality of compression methods.

2. The method of claim 1, wherein the at least one input comprises: (i) a source file descriptor, (ii) a user-defined-input, (iii) transmission method, (iv) network information, (v) information indicative of systems being utilized, and (vi) historical information.

3. The method of claim 2, wherein the source file descriptor includes one or more of modality, frame rate, image/frame count, pixel resolution, color depth, or informational entropy; and wherein selection of the transmission strategy is based on the modality and wherein the modality comprises data indicative of a type of file that utilizes different colors, contrasts, resolutions, or intensity.

4. The method of claim 2, wherein historical information comprises (i) an end use and corresponding image fidelity for selected data and (ii) previously selected parameters for the selected data.

5. The method of claim 1, wherein the pre-transmission processing of the data comprises pre-processing and compressing the data.

6. The method of claim 5, wherein post-transmission processing the data transmitted comprises decompressing and post-processing the data transmitted.

7. The method of claim 1, wherein selecting the transmission strategy comprises selecting a pre-processing technique and a compression method.

8. The method of claim 1, wherein the pre-transmission processing of the data comprises highly compressing a first portion of the data and preserving a second portion of the data.

9. The method of claim 8, wherein the Monte Carlo simulation includes one or more of (a) lossless evaluation, (b) transmission analysis, (c) sampling, (d) execution, and (e) evaluation of historical data.

10. A method for transmitting a source file representing visual images, comprising:
generating the source file using an imaging device;
receiving at least one input relating to a transmission of the source file at a transmission system;
eliminating one or more of (a) a subset of a plurality of the pre-processing techniques or (b) a subset of a plurality of compression methods based on a type of the source file and the at least one input;
using the transmission system to select a transmission strategy, wherein the transmission strategy is selected based on (a) a Monte Carlo simulation of each remaining pre-processing techniques of the plurality of pre-processing techniques and each remaining compression methods of the plurality of compression methods of each remaining pre-processing techniques of the plurality of pre-processing techniques and each remaining compression methods of the plurality of compression methods configured to maximize image fidelity, minimize data size, or some combination thereof, (b) preferences indicated by the at least input, and (c) the source file, and wherein the transmission strategy comprises at least one pre-processing technique selected from a plurality of pre-processing techniques and at least one compression method selected from a plurality of compression methods;
pre-transmission processing the source file using the selected transmission strategy, wherein the pre-transmission processing comprises pre-processing the source file using the at least one pre-processing technique and compressing the source file using the at least one compression method;
generating metadata reflecting the pre-processing technique and the compression method;
transmitting the source file after the pre-transmission processing to a receiving station;
transmitting the metadata generated; and
decompressing and post-processing the source file transmitted to the receiving station using the generated metadata using the metadata generated.

11. The method of claim 10, wherein the at least one input comprises: (i) a source file descriptor, (ii) a user-defined-input, (iii) an environment dynamic, and (iv) historical information.

12. The method of claim 10, wherein the transmission system selects the transmission strategy by at least one of: (i) iterating through combinations of pre-processing techniques and compression methods, and (ii) using a lookup table.

13. A system for transmitting data, comprising:
a transmission system that comprises a general-purpose computer configured to:
- receive at least one user-defined input relating to the transmission of the data;
- eliminate one or more of (a) a subset of a plurality of pre-processing techniques or (b) a subset of a plurality of compression methods based on a type of the data and the at least one user-defined input;
- select a transmission strategy by selecting a pre-processing technique from a plurality of pre-processing techniques and a compression method from a plurality of compression methods based on (a) a Monte Carlo simulation of each remaining pre-processing techniques of the plurality of pre-processing techniques and each remaining compression methods of the plurality of compression methods configured to maximize image fidelity, minimize data size, or some combination thereof, (b) preferences indicated by the at least one user-defined input, and (c) the data;
- pre-transmission process the data using the selected transmission strategy;
- generate metadata reflective of the selected transmission strategy;
- transmit the processed data; and
- transmit the generated metadata.

14. The system of claim 13, further comprising an imaging device configured to generate a source file containing the data.

15. The system of claim 13, wherein the at least one input comprises: (i) a source file descriptor, (ii) a user-defined-input, (iii) a system environment dynamic, and (iv) historical information.

16. The system of claim 15, wherein the source file descriptor includes one or more of modality, frame rate, image/frame count, pixel resolution, color depth, or informational entropy; and wherein the modality comprises data indicative of a type of file that utilizes different colors, contrasts, resolutions, or intensity thereby enabling selection of a selected transmission strategy.

17. The system of claim 13, further comprising a receiving station configured to process the transmitted processed data using the generated metadata.

18. The system of claim 17, wherein the receiving station is configured to decompress and post-process the transmitted data.

* * * * *